March 10, 1925.   1,528,944
F. B. NEWELL
COMPUTING DEVICE
Filed June 27, 1923
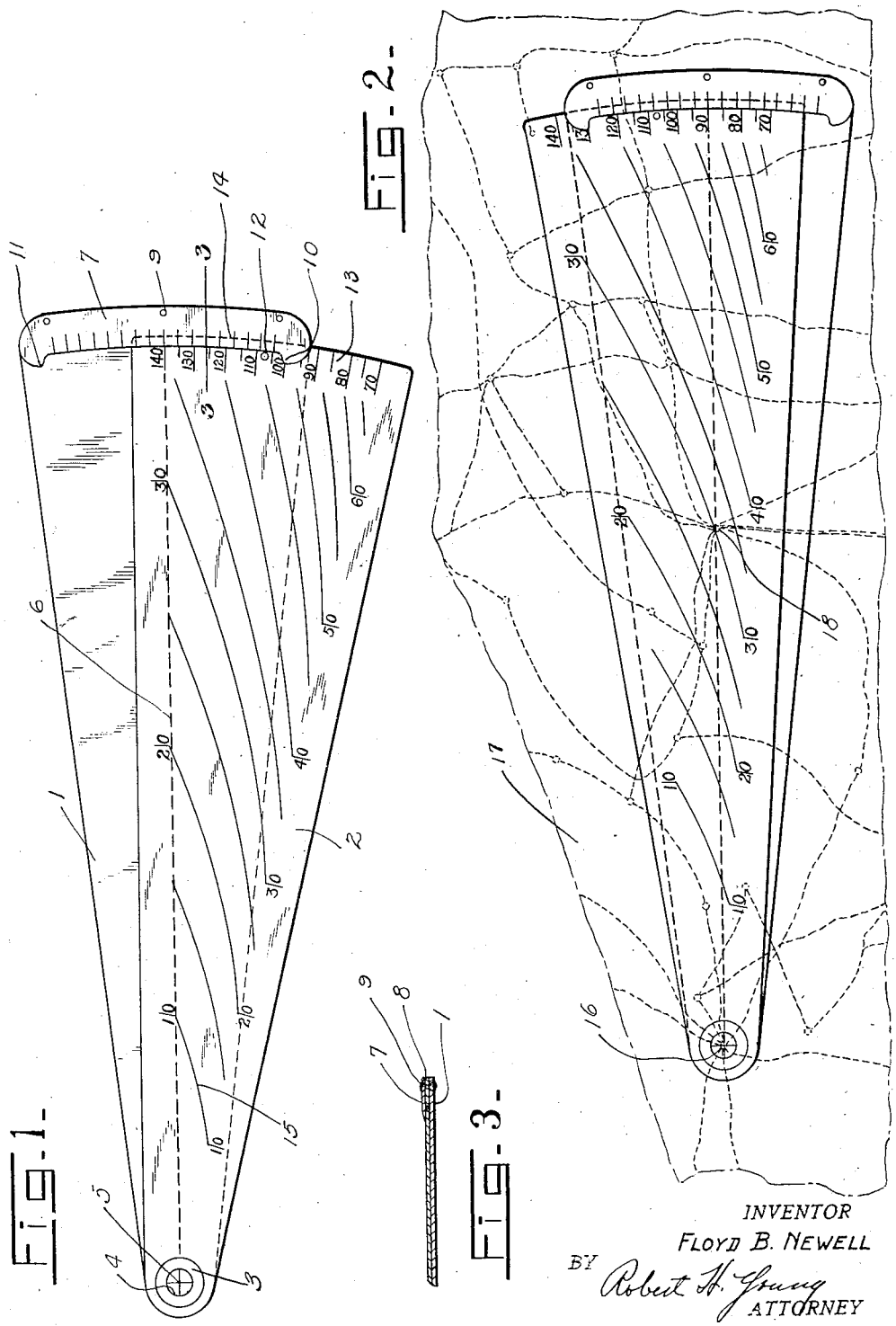
INVENTOR
FLOYD B. NEWELL
BY Robert H. Young
ATTORNEY Patented Mar. 10, 1925.

1,528,944

UNITED STATES PATENT OFFICE.

FLOYD B. NEWELL, OF ELMIRA, NEW YORK.

COMPUTING DEVICE.

Application filed June 27, 1923. Serial No. 648,044.

*To all whom it may concern:*

Be it known that I, FLOYD B. NEWELL, a citizen of the United States, residing at Elmira, in the county of Chemung and State of New York, have invented certain new and useful Improvements in Computing Devices, of which the following is a specification.

This invention relates to a ground speed and time computing device.

One object of my invention is to provide a device of this character, which may be easily manipulated for the computation of ground speed, time or distance, by placing the same upon a map of the correct scale.

A second object is to provide a device of this character consisting of two sheets of transparent material which are pivotally connected, and which may be placed upon a map and so moved relatively that speed or time may be read directly from the scale.

Further objects will be more fully set forth in the attached specification and claims.

According to the drawings:

Fig. 1 is a plan view of the computing device.

Fig. 2 is a plan view of the same as applied to a map, and

Fig. 3 is a section on the line 3—3 of Fig. 1.

The computing device consists of two sheets of transparent material 1 and 2, which are superimposed one over the other and pivotally connected by means of a fastener 3, having an internal opening 4 of considerable size, so that the two sheets are pivotally connected about the axis 5. The lower sheet 1 is provided with a reference line 6 in alignment to the axis 5. The end of the upper sheet 2 is guided between the sheet 1 and the upper plate 7, a spacing plate 8 being provided between sheet 1 and plate 7 so that the upper sheet 2 may be freely movable about the axis 5. Rivets 9 attach the plate 7 to the lower sheet 1 and the spacer 8. At the ends of the plate 7 are projections 10 and 11, one at either end of the plate which coact with a pin 12 extending upwardly from the upper sheet 2 to prevent this upper sheet from being moved more than predetermined amount about the axis 5.

A scale designated 13 and which represents miles per hour or other units of speed, is provided on the end of the sheet 2 as shown and a vernier 14 coacting with a scale 13 is provided on the plate 7. The scale 13 is adapted to be used in conjunction with reference line 6, as will be later more fully described. Upon the upper or lower face of the upper sheet 2 is a series of curves 15 which represent the time; that is, each curve of the series is so shaped and situated in relation to the axis 5, the reference line 6, and the scale 13 that wherever this line crosses the reference line 6, with the reference line 6 properly adjusted to the scale 13, the distance between this point of crossing and the axis 5 will represent to a certain scale the distance travelled. The lines of the scale 15 are properly indexed in minutes or other units of time.

The device is particularly adaptable for airplanes and may be used to determine the time required to go from one place to another when the ground speed can be estimated. In order to do this, the instrument is placed on a map which is drawn to the scale for which the instrument is constructed, and the landmark over which the aircraft is passing is located at the cross lines in the circle at the axis 5. Such a point is designated at 16 on the map 17 of Fig. 2. The upper sheet is then moved relatively to the lower one until the reference line passes through the estimated ground speed indication on the scale 13. Then the whole instrument is shifted until the reference line passes through the points on the map over which the aircraft is expected to pass, while still maintaining the point 16 at the axis 5. The aircraft must of course fly a straight level course; the time required to reach a second landmark as the point 18 on the map, may be read from the instrument, sighting along the time lines which in the example in question would fall on the thirty minute line. In case the aircraft does not reach the second landmark in the time computed, and gets there sooner or later, then the estimated ground speed was in error and the real ground speed may be determined by shifting the speed scale relatively to the reference line until the line on the scale 15 representing the actual time required to go from station 16 to station 18 passes through station 18 on the map. The reference line 6 will then pass through the points on the speed scale corresponding to the ground speed.

In the plate instrument which has been used as an example for purposes of illustration of my invention, the reference line is shown as drawn on the lower piece of transparent material and passing through the axis. However, I am aware that the instrument might have been constructed so that this line moves perpendicularly to its direction instead of rotating about a fixed point and I do not desire to be restricted to the precise embodiment shown and described.

I claim:

1. A computing device for use in conjunction with a map comprising two pivotally connected segmental sheets of transparent material, a radial reference line on one sheet, a scale for the end of said line on the other sheet, a series of lines on said other sheet arranged to intersect said radial line, the lines of said series bearing a definite relation to their respective distances from the axis of said pivotal connection.

2. A computing device for use in conjunction with a map comprising two superimposed segmental sheets of material, a ring pivotally interconnecting said sheets, an indicating point within said ring for marking the pivotal axis, a single central radial reference line on one sheet, a scale for the end of said line on the other sheet, a series of curves on said other sheet, the curves and line representing time and speed in a definite predetermined relation.

3. A navigation computing device for use in conjunction with a map comprising two superimposed segmental sheets of transparent material, a connection pivotally interconnecting said sheets so as to permit relative movement of the same about a reference point, a reference line aligned with said reference point centrally arranged on the lower one of said sheets, a scale for the end of said line graduated in units of speed on the other sheet, a series of curves graduated in units of time on the said other sheet, the curves and line bearing a definite predetermined relation to each other and to the reference point whereby computations may be readily made by applying said reference point to a definite location on a map.

In testimony whereof I affix my signature.

FLOYD B. NEWELL.